United States Patent [19]

Gutierrez Atencio

[11] 4,358,220
[45] Nov. 9, 1982

[54] FUNCTIONALLY TRANSFORMABLE DAM

[76] Inventor: Francisco J. Gutiérrez Atencio, Estafeta Fr. Garcia, 3105 Diamante Prov., Entre Rios, Argentina

[21] Appl. No.: 133,441

[22] Filed: Mar. 24, 1980

[51] Int. Cl.³ .......................... E02B 9/00; E02B 9/08
[52] U.S. Cl. ........................................ 405/75; 405/76
[58] Field of Search .................................. 405/75–78; 60/398; 290/52, 53, 42

[56] References Cited

U.S. PATENT DOCUMENTS

| 4,159,188 | 6/1979 | Atencio | 405/78 |
| 4,170,428 | 10/1979 | Atencio | 405/78 |
| 4,261,171 | 4/1981 | Atencio | 405/76 X |
| 4,289,971 | 9/1981 | Veda | 405/78 X |

Primary Examiner—David H. Corbin
Assistant Examiner—Nancy J. Pistel
Attorney, Agent, or Firm—Emory L. Groff, Jr.

[57] ABSTRACT

A hydrodynamically transformable dam with a fluid path through its main body includes a hydromotive body containing one or more hydromotive assemblies each having a fluid conduit provided with an energy transformation unit. The function of the dam is selectively transformed by controllably displacing the hydromotive body to alternately position its respective conduits relative the main dam body and fluid path whereby either a sluicing action or an energetic transformation is achieved by fluid flowing through the dam. The alternate functions are obtained by fluid flows operating in either a pure hydroelectric mode, a combined reversible pumped-storage manner or a tidal powered mode.

14 Claims, 7 Drawing Figures

FUNCTIONALLY TRANSFORMABLE DAM

The present invention relates generally to a functionally transformable dam and more particularly, to an improved dam installation having a fluid flow conduit defined through its main body and cooperating with a displaceable hydromotive assembly shiftable between alternate positions so as to perform either in a pure water sluicing mode or alternatively, in a hydrodynamic powered mode.

By the present arrangement, a dam may be functionally transformed from a pure non-powered hydrodynamic performance to a pure powered hydrodynamic performance. Fixed guide means located upstream and downstream of the dam allow for selective displacement of a hydromotive assembly and diffuser respectively, away from the dam fluid flow passageway after either a direct or reversed generating cycle so as to transform the passageway into a sluiceway conduit to aid in either filling of the basin after a flood generation cycle is finished, or in emptying this same basin after an ebb generation cycle is finished. With this displacement of the dam components, not only is it possible to provide for both direct and indirect energy generation during an ebb tide cycle as the basin is emptied or during a flood tide cycle as the basin is filled, but also during a portion of both these cycles the same hydromotive assembly body is angularly displaced and becomes a sluiceway.

The potential for hydroelectric power from lowhead sites in this country is very good yet little development has been accomplished in the available plain alluvial rivers. For example, it is calculated that the Mississippi River has a powered potential of some 30,000,000 KW between Saint Louis, Missouri and New Orleans, Louisiana at a rated flow of 20,000 m$^3$/sec. and an available hydraulic head of some 150 meters.

Additionally, the potential for coastal tidal powered installations has not been fully realized although the technology is presently available. This concept is most readily adaptable in coastal sites of several industrialized countries as: United States-Passamaquoddy Bay, Anchorage, Cook Inlet; Canada-Minas Basin, Chignecto Bay, Shepody Bay, Cumberland Basin, Annapolic Bay, etc; Great Britain-Bristol Channel, Severn project, Morecombe Bay, Bay of Wash, Solway Fith, etc.; France-Chausey Islands, Le Minquiers, etc. and Australia-Secure Bay, Walcott Inlet, St. George's Basin, George Water Inlet etc.

Studies have been conducted for several sites but economic barriers have until now precluded the practical application of known power generation systems despite the rapid depletion of non-renewable resources. Now, by the present invention, an efficient and economical system is provided.

Accordingly, one of the objects of the present invention is to provide an improved functionally transformable dam having a fixed fluid passageway therethrough cooperating with a displaceable hydromotive assembly and operable, alternatively, as a power producing means or as a relief flow operating means either to maintain maximum permissible headwater level during abnormal high-water periods, or to act as a fluid flow passageway when the hydromotive assembly turbines are not in operation.

Hydromotive installations require that within one or two minutes after an emergency shut-down of the turbines, the entire water flow must be diverted to the weir sections so as to avoid suction waves, surge phenomena, etc., and also in catastrophic cases to allow for the evacuation of flood waters. Such a demand places a severe burden upon the weir closure devices. A similar situation occurs in open channel power stations wherein a bend of the river is cut-off by head-water or tail-water channels. In such an instance, no gate control system however efficient can compensate for the suction waves or surge phenomena during power load rejections.

Another object of the present invention is to provide an improved functionally transformable dam having a fixed fluid passageway through its main body, operable in multipurpose modes either for direct or indirect hydropower production, reversed pumped storage operation or as a sluiceway.

By the present arrangement, the larger discharge capacity of the functionally transformed fluid conduit acting in the sluiceway mode is many times greater than the flow-power rated discharge capacity of a plurality of powerhouse conduit feeding means. Thus, only one of the instant functionally transformable conduits can replace the duty of several conventional non-functionally transformable conduits thereby effectively relieving the above described hydrodynamic hydraulic transient phenomena.

Another aim of the present invention relates to the adaptability of the installation to follow increasing hydropower requirements as are necessary to keep pace with the power market growth and increases, as years pass.

A further object of the present invention is to provide an improved functionally transformable dam serving as an initial base-load hydrostation and readily adaptable for expansion to a peak-load hydrostation or conversion to a reversible pumped-storage hydrostation.

Another aim of the present invention deals with utilization of the flexibility associated with the development of the horizontal-axis hydroelectric turbine-generator set which today is limited to turbine runner diameters of up to 7.5 meters but, in the near future are expected to employ runners of up to 10 meters with advantages of greater powered output per machine and more economy in investment per installed kilowatt.

In this manner, the functional transformation concept also will allow for the future dametral expansion of the turbine runners by simply expanding the diameter of the concerned fluid flow conduits such as by changing the annularly defined sections embodied within the dam structure. This achievement can be realized by utilizing the same gates and fluid flow controlling structures.

The instant functional transformation concept is also useable in the transportable components of future dam embodiments, such as the caissons planned for tidal dams in several sites of modulated conception. These caissons must be towed to their destination and anchored at a slack water period during high tide and is feasible if the tidal current speed is lower than 4.5 meters/second. In some places however, higher tide currents are encountered and such caisson placement would be difficult if not impossible. Then, the transformation principle permits the incorporation of motive units within the framework structure of the caissons, so as to induce an hydraulic hydrodynamic thrust opposing the pull of the tidal current. By energizing the motive units from an external powered source and utilizing the advantages of a Kaplan turbine runner principle, which affords a regulated induced thrust, then such variable tidal current pulls are easily neutralized during the several days in which said caissons modules must be manoeuvred to be sited in place.

By joining together a plurality of said caissons, and linearly disposing them then, a high speed long range transportation method is developed if the caissons must be built in proximity of populated industralized centers having supporting facilities.

Another aim of the present invention involves the introduction of the functional transformation principle into tidal powered projects which until now have been mostly operated on a single-basin single-effect tidal cycle and which easily can be functionally transformed into a single basin double-effect tidal cycle, with advantages of greater energetic output and better power loads, all without introducing costly movable bladed Kaplan turbine runners.

To achieve the above, turbine generator sets and optionally, the related diffusers, are embodied within a rotatably displaceable structural body which in turn is shifted against the dam or over a fixed retaining and supporting structure.

By means of the present functional transformation concept, existing tidal projects designed along the lines of the Rance type of tidal project and which now have an energetic yield of about 75% efficiency, can be raised in efficiency up to nearly 90%. As in the Rance example, annual energetic output can be raised from 0.520 Twh/year up to Twh/year with the same power installation of 240,000 kW.

Another aim of the present invention deals with the elimination of costly sluiceway structure and their respective gates and operating mechanisms for flow control.

Unlike conventional hydroelectric spillway gates, sluices of a tidal power plant need to be opened and closed in accordance with the diurnal tidal regime or about 705 times annually. Thus, such gates must be capable of rapid, frequent operation and be as free as possible of maintenance and operating problems. In these cases it is essential that the gate setting ensures an adequate submergence at all times in order to avoid damage or operational difficulty through wave impact, ice-jamming, freezing and corrosion of the gate mechanisms. Often, conventionally submerged, vertical-lift gates with hydraulic hoists are provided.

The present functionally transformable concept permits elimination of these costly sluiceway gates and arrangements of operating mechanisms. In this connection, the rotatable structural body which includes the turbine-generator sets and diffusers are rotatably displaced to open the dam with this action occurring against the reduced hydraulic head at which a powered sequence ends, for example at 1.5 meters.

To achieve this goal, assuming that a plurality of three or more turbine-generator sets are embodied in the rotatable structural body, then one of the turbine runners located at one edge of the body is caused to operate in the generation mode thus inducing a positive thrust upon the rotatable structure. At the same time, an oppositely disposed turbine runner is abruptly disconnected from the electric network and so caused to operate in an overspeed mode thereby inducing a negative thrust upon the rotatable structure. After releasing means retaining the structural body, the induced momentum permits the rotation of the rotatable body until a 90° position is attained. In this rotated position, an ample sluicing mode is realized because of a significant gap that is made available for permitting the free passage of incoming waters in a flood cycle, or of the outgoing waters in an ebb cycle. The foregoing action is an advancement over all existing designs in tidal control systems and is made possible by the introduction of the present functional transformation principle.

The above 90° position is maintained until both water levels, at the basin side and at the sea side, are nearly equalized. After equalization, the rotatable body is actuated by motorizing supporting roller elements in order to complete a 90° rotation and thereby achieve a full 180° rotation sequence. The sluiceway gap will now be closed and a hydraulic head differential begins to develop on both sides of the damming arrangement to start the opposite tidal cycle.

To avoid oscillation of the rotatable structure, fixing mechanisms must be provided at each of the 0°, 90° and 180° positions, while suitable braking methods are used when the 90° position is reached.

Another side of the present invention deals with the introduction of multiple-tandem turbine-generator sets. By means of this, higher closure gaps may be filled in coastal sited bays, inlets, and the like, thus introducing a greater unitary power concentration per linear meter of the civil engineered works.

Closures at great depths are better performed in a full powered vertical arrangement having two sets of coplanarly arranged generator-turbines, three sets of coplanarly and so on. This arrangement is suitable in those sites in which a great concentration of power must be realized in a very short longitudinal path of civil engineered structures.

Another aim of the present invention deals with the instant replacement of non-operative turbine-generator sets.

A functional transformation is introduced by means of which one non-operative turbine-generator set is instantly transformed into an operative turbine-generator set by the instant replacement of same and is brought about due to maintenance requirements.

Because assumed maintenance requirements are one week per unit for an annular inspection and ten weeks once every five years for an overhaul then, one additional unit per each 16 units need be provided. In other words, 6 sets per each 100 sets are required as spare units but with the present proposition, one can expect a substantial reduction in the maintenance schedules.

Another advantage of this instant functional transformation ability deals with a raised powered production, expected to amount to up to 3.5%. Accordingly, a two-fold objective is realized. On one hand, a full 100% energetic powered output is available at the switchyard of a tidal plant and on the other hand, the quantity of rechangeable spare machines is substantially reduced.

Another aim of the present invention deals with the functional transformation of the tidal power cycle from that of a lunar day cycle to another of a solar day cycle. This is achieved by means of combined motor/generator pump/turbine sets, expected to operate alternatively in the direct generation mode and in the reversed accumulation mode, all with turbine runners of the fixed bladed design.

Expected energetic tidal yields are increased and the effectiveness increases with basin surface area corresponding to the pumping level, since the larger this surface area the slower the increase in the hydraulic head that has to be overcome. This pumping effect can be utilized also for interspring-tide regulation of the output of a single-basin double-tide working scheme. Pumping can also be used to create a phase shift in the tidal power plant operation. This operation enables the output of the tidal plant to be fed into the system during peak loads.

Another aim of the present invention involves the action of the functional transformation principle with the self-induced energetic yield of the concerned tidal station. This fact results because of the full development of the hydrodynamic phenomena of the wave reflecting action within the basin reservoir boundaries and which is made possible by the ample sluiceway capacity made possible by this invention.

After reflection, this filling wave induced at the end of the flood tidal cycle, returns to the dam structure body with its crest being above the initial sea level. If the dam is quickly closed at exactly this instant then, the tidal plant can operate during the ebb tidal cycle (basin to sea cycle) under the additional hydraulic head created by the reflection of the flood wave.

Because of the application of this inventive concept, applying the present rotative functional transformation principle, a very rapid filling procedure of the basin reservoir is allowed, for purposes of fully realizing the utilization of this wave reflection hydrodynamic hydraulic phenomena.

The proposed functional transformation between energetic and sluicing modes by a rotative displacement offers an improvement over my earlier U.S. Pat. No. 4,261,171 issued Apr. 14, 1981 and which discloses transformation of a hydro-motive assembly by means of vertical or horizontal displacement thereof.

Reference is now made to a preferred and practical variety of embodiments of the proposed invention, as described and shown in the accompanying drawings, in which.

Similar reference characters designate corresponding parts throughout the several figures of the drawings.

The arrangements disclosed in FIGS. 1-5 of the drawings reflect an improvement on the structure illustrated in the above referenced U.S. Pat. No. 4,261,171 and includes a downstreamly located conduit member 36 mounted on appropriate guide means permitting selective rectilinear displacement of the conduit member to and from juxtaposition a fluid flow passage 33 formed through the main dam body 28. In the embodiment shown in FIGS. 1-3, the guide means 20 comprises an inner channel 21 having terminal stop means 22 at its upstream end and an open end 23 at its downstream end. In this manner, cooperating guide means carried by the conduit member 36, such as rollers (not shown), are introduced into the inner channel 21 of the guide means 20 to allow the aforedescribed rectilinear displacement of the conduit member 36, which in this instance will be seen to comprise a horizontal displacement. The guide means 20 will be seen to be formed as a part of the auxiliary slab 26 and adjacent dam main body supporting slab 34.

Figure 1:
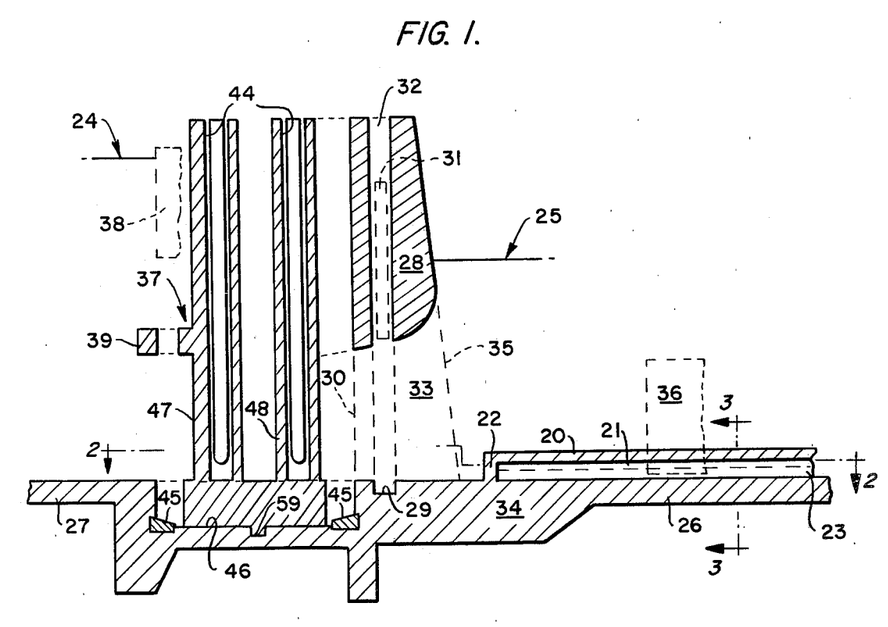
FIG. 1 is a vertical, longitudinal sectional view of a functionally transformable dam according to the present invention.
Figure 4:
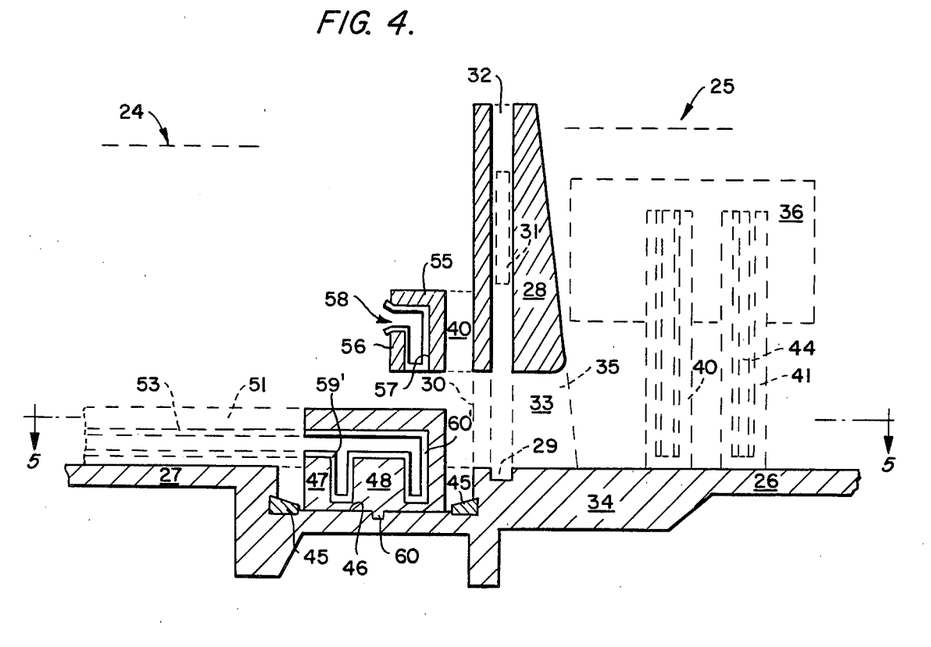
FIG. 4 is a vertical, longitudinal sectional view of a modification of the transformable dam shown in FIG. 1.

The dam main body supporting slab 34 is joined to an auxiliary upstream slab 27 which includes an upwardly facing pit basin 46 adapted to contain a rotatably displaceable conduit-containing hydromotive assembly 38 such as depicted in the referenced U.S. Pat. No. 4,261,171. The upstream water level 24 on the basin side of the dam body 28 as well as the downstream or sea side water level 25 are depicted in FIGS. 1 and 4. The dam body 28 includes a gate 31 vertically displaceable between the slots 32 and adapted to be lowered into the recess 29 to close off fluid flow through the passage 33 from between the upstream open end 30 and downstream open end 35 thereof. If such a gate 31 is not employed then, a simpler stop log arrangement may be provided for temporarily closing the dam passage 33.

Figure 2:
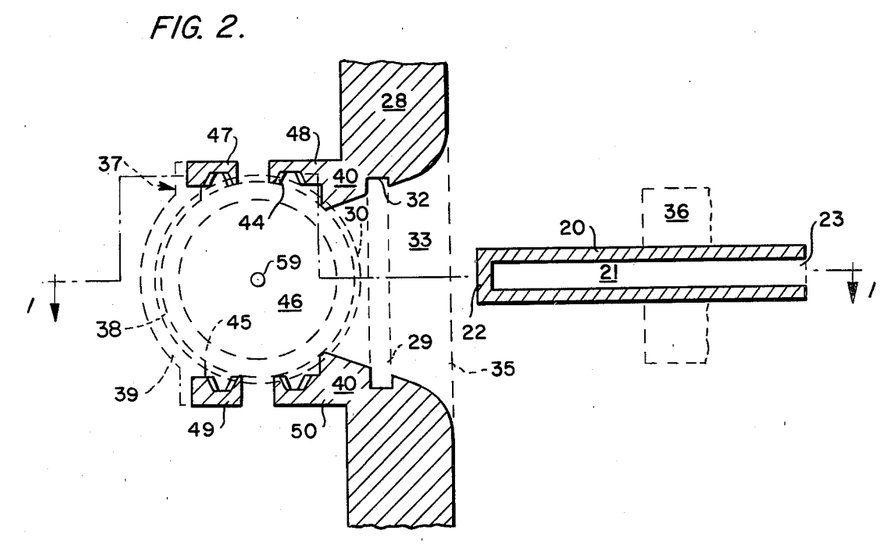
FIG. 2 is a horizontal, longitudinal sectional view of the structure shown in FIG. 1.

When the displaceable conduit 36 is disposed in the position as shown in FIGS. 1 and 2 that is, away from the main dam body passage 33, it will be understood that the dam functions in a non-energetic hydrodynamic mode. On the other hand, if the displaceable conduit 35 is rectilinearly shifted to a position juxtaposed and axially aligned with the passage open end 35, then, the dam functions in an energetic hydrodynamic mode.

In the same manner, the substantially upstreamly disposed hydromotive assembly 38 is shiftable between alternate positions. A vertical or a combined vertical-rotatable displacement of the hydromotive assembly 38 may be employed as the assembly is shifted from a first position juxtaposed and aligned with the upstream open end 30 of the dam passage 33 to an alternate position, elevated above the open end 30 of the dam passageway and adjacent the upstream water level 24 as shown in FIG. 1. As in the case of the alternate positions of the downstream conduit member 36, when the hydromotive assembly 38 is juxtaposed the dam passage 33, the dam functions in an energetic hydrodynamic mode while when displaced to the removed position, the dam functions in a non-energetic or sluicing hydrodynamic mode.

Figure 3:
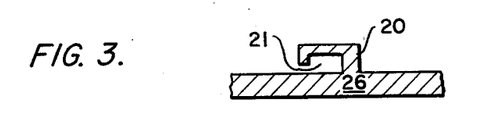
FIG. 3 is a transverse sectional view along the line 3—3 of FIG. 1.

In the embodiment of FIGS. 1-3, the hydromotive assembly 38 is controlled between its alternate positions by guide means comprising piers 47, 48, 49 and 50 comprising vertically disposed piers each provided with appropriate guide surfaces 44. Suitable roller means as shown in my earlier patent may be included on the hydromotive assembly 38 for engagement within the vertically disposed guide means. The two upstream piers 47 and 49 are preferably joined by an auxiliary retaining member 37 including the arched portion 39 which assists in providing a more positive support of the hydromotive assembly 38 when disposed in its alternate positions.

A rotatable displacement of the hydromotive assembly 38 when displaced between its alternate functional modes is achieved by the provision of the annularly disposed runner support surface 45 formed around the inner peripheral wall of the basin 46 which basin includes a centrally disposed depression 59. These components will be understood to facilitate the controllable rotation of the hydromotive assembly relative the dam body 28 and its extensions 40 which are peripherally disposed about the upstream open end 30 of the fluid flow passage 33. Additionally, appropriate roller means carried by the hydromotive assembly will be understood to cooperate with the runner support surface 45. Thus, when the conduit-containing hydromotive assembly 38 is juxtaposed the upstream open end 30 of the fluid flow passage 33 in a first mode, a positive energetic functional mode will be realized and then, when the hydromotive assembly is rotated 180° into a second position, a reversed negative functional mode is obtained. It will be appreciated that these alternate functional modes will apply in not only a tidal powered installation but also in a situation dealing with reversible, hydroelectric pumped-storage installations.

Figure 5:
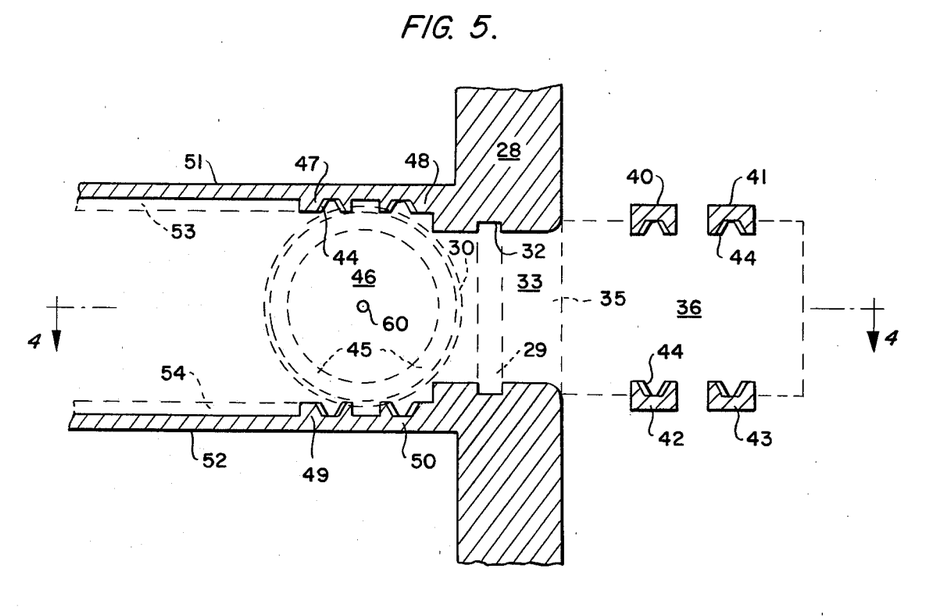
FIG. 5 is a horizontal, longitudinal sectional view of the same structure shown in FIG. 4.

In the arrangement illustrated in FIGS. 4 and 5 of the drawings, the downstreamly located conduit member 36 is mounted for substantially vertical rectilinear displacement to achieve the shifting of this conduit member between two functional modes. On the other hand, the upstreamly located hydromotive assembly 38 is mounted for a combined vertical horizontal displacement and alternatively, a rotatable displacement relative the upstream open end 30 of the dam main body fluid flow passage 33. Thus, the hydromotive assembly 38 and the conduit member 36 will be understood to still be displaced to and from juxtaposition the fluid flow passage 33 as the dam function is altered.

The vertical rectilinear displacement of the conduit member 36 is accomplished by means of guide means 40,41,42 and 43 comprising the vertically disposed piers each having a running surface 44 adapted to cooperate with appropriate roller means carried by the conduit member 36. When disposed in its lowermost position the conduit member 36 is juxtaposed and aligned with the dam fluid flow passageway open end 35 and functions in an energetic mode while when displaced to its alternate raised position, as shown in FIG. 4, the apparatus functions in a non-energetic mode for example, as a sluiceway when the gate 31 is raised within the slots 32.

In this same embodiment, the guide means 47,48,49 and 50 will be understood to cooperate with the lower portion of the displaceable hydromotive assembly 38 such as that employed in the first described embodiment while additional, upper guide means 58 comprising guide members 55-56 are adapted to cooperate with the upper portion of the hydromotive assembly 38. Appropriate roller means (not shown) on the concerned hydromotive assembly engage the running surfaces 53-54 of horizontal guide means 51-52 to permit horizontal rectilinear displacement of the hydromotive assembly to and from juxtaposition the upstream open end 30 and when the hydromotive assembly is in its forwardmost position, these rollers will be understood to then communicate with and enter the adjacent vertical guide means 59',60'. Likewise, similar roller means are carried by the hydromotive assembly and cooperate with the piers 55 forming the upper guide means 58 which piers in turn are joined to the dam main body 28 by structural members 40.

The substantially cylindrically formed supporting basin pit 46 allows rotatable displacement of the hydromotive assembly 38 about the centerline axis 60 while the hydromotive assembly is being supported upon the annular support surface 45, similar to the arrangement described in connection with the embodiment of FIGS. 1-3. When the displaceable hydromotive assembly 38 is juxtaposed the dam fluid flow passage open end 30 a direct positive energetic mode is achieved when the upstream or basin water level 24 is above that of the downstream or sea level 25 or alternatively, following a 180° rotation of the hydromotive assembly, a reversed negative energetic mode is realized when the basin level 24 is below the sea level 25 and the dam is functionally transformed from a hydrodynamic operative energetic mode to another hydrodynamic energetic mode.

Considering that the hydromotive assembly 38 includes a reversible pumping-generation set, then its status is additionally transformed in pure hydroelectric installations by alternatively producing a direct generation energetic mode or a pumped/storage energetic mode. When functioning in the hydrodynamic energetic powered mode, the downstream conduit member 36 will be understood to be juxtaposed the downstream open end 35 of the fluid flow passage 33. On the other hand, when both the downstream conduit member 36 and upstream hydromotive assembly 38 are displaced away from their respective open ends 35 and 30 of the fluid flow passageway 33, the dam status is transformed to hydrodynamic non-energetic mode and allows of a sluicing mode either in a positive manner from the basin to the sea or alternatively in a negative manner from the sea side to the basin side of the dam body 28.

Figure 6:
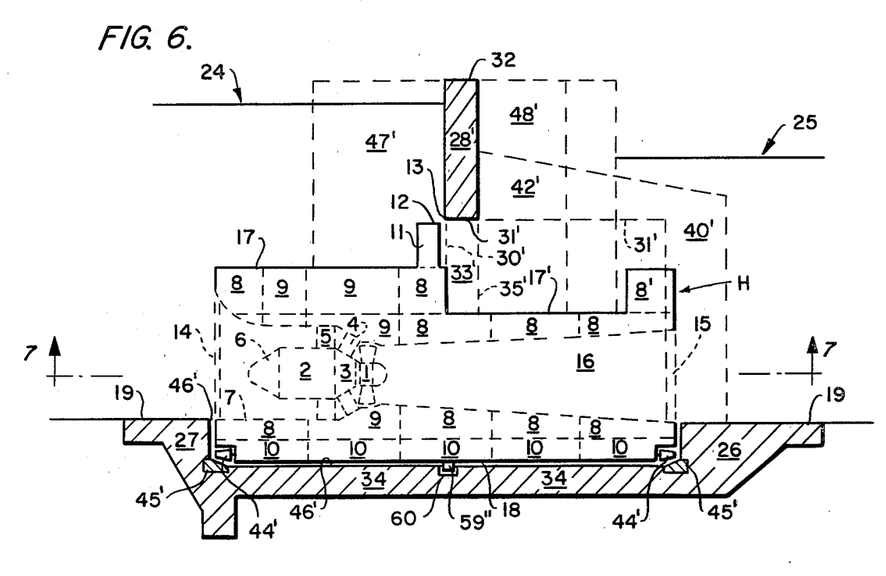
FIG. 6 is a vertical, longitudinal view of a modification of the functionally transformable fluid storing and retaining arrangement according to the present invention.
Figure 7:
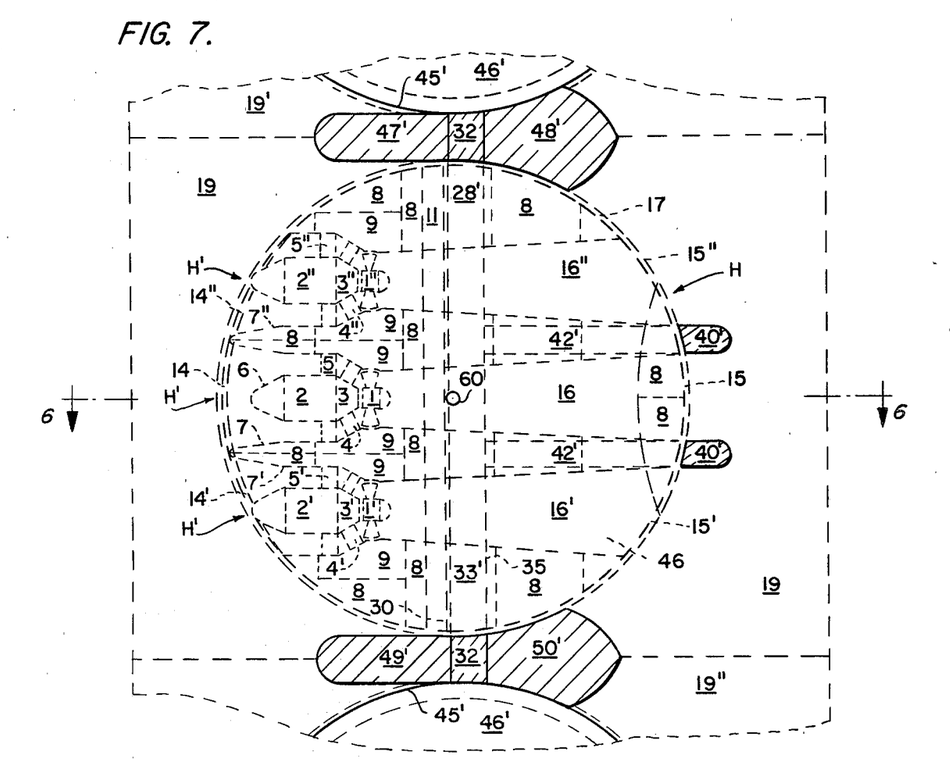
FIG. 7 is a horizontal, longitudinal view of the structure shown in FIG. 6.

The improvement shown in FIGS. 6-7 discloses an arrangement applicable to both a tidal powered installation as well as low-head hydroelectric stations and may be designed as a water retaining structure combined with a fixed concrete structure. Alternatively, this arrangement may be constructed to comprise a plurality of transportable components subsequently joined together and combinably sunk into position over an appropriate foundation to form either a dam or a structural arrangement allowing combination with movable components of complimentary structures.

FIGS. 6 and 7 illustrate a combination of fixed fluid containing and retaining structure and a displaceable hydromotive body which is shiftable in order to transform the functional mode of the installation. This transformation produces alternatively, a positive direct tidal powered arrangement, a sluiceway discharging arrangement, or a negative reversed tidal powered arrangement as will be seen hereinafter. This displaceable hydromotive body is primarily rotatably displaceable but will be understood to be capable of combined vertical-horizontal displacement for purposes of removing it from the cooperating fixed dam structure.

The displaceable hydromotive body H contains one or more hydromotive assemblies H' each including a turbine-generator set and a respective diffuser body. Three adjacent such hydromotive assemblies H' are shown in the drawings. Centrally disposed upon the upper portion of the hydromotive body H is a longitudinally extending fluid retaining or closure wall 11 which will be seen to be combinable with the fixed dam structure comprising the dam main body wall 28'.

Each turbine-generator set associated with each hydromotive assembly H' comprises a turbine runner 1, 1' or 1" combined with a respective generator 2, 2' or 2" by a connecting shaft and bearing 3, 3' or 3" and is associated with a movable vaned distributor 4, 4' or 4" and a fixed distributor 5, 5' or 5". Each generator is enclosed within a hermetic capsule 6 and is disposed in a manner spaced inwardly of the peripheral wall defining a fluid flow conduit or path 7,7' or 7" in the intake portion of the respective hydromotive assembly. Joined to and axially aligned with the intake portion is a diffuser body 16,16' or 16" which forms the outlet portion of each hydromotive assembly conduit. Each conduit includes an inlet open end 14,14' or 14" while each diffuser is provided with an outlet open end 15,15' or 15".

The rotatable hydromotive body H is provided with a plurality of hermetic chambers 8, 9 and 10 which are used respectively, as buoyancy compartments, machine hall compartments and ballasting compartments and are contained within the hydromotive body between the upper walls 17 and 17' and the bottom wall 18. The fluid retaining or closure wall 11 of the hydromotive body H is provided with sealing means 12 adapted to cooperate with sealing means 13 provided on the dam main body wall 28' such that when the hydromotive body H is disposed as shown in FIG. 6, the walls 11 and 28 form a true fluid retaining structure of the dam installation.

In this embodiment, no gates are provided as fluid flow control is achieved by means of the movable vanes of the distributor 4,4' or 4" and which are located upstreamly of the turbine runner 1,1' or 1".

The hydromotive body H is adapted to be disposed within the basin pit 46' with its bottom 18 being supported by means of a plurality of roller elements 44' annularly disposed around the hydromotive assembly body centerline axle 59" which latter is disposed within a recess 60 defined in the upper portion of the dam support slab 34 containing the basin 46'. The roller elements 44' will be seen to engage the running surface 45' which is annularly disposed around the walls of the pit basin 46'. When it is desired to rotate the hydromotive body H in order to shift the function of the dam installation, the rollers 44' are motorized after appropriate locking means (not shown) are released. An appropriate downstream supporting slab 26 and upstream supporting slab 27 form extensions of the dam supporting slab 34 and will be understood to be part of the overall fixed dam body. This fixed portion of the dam construction includes a plurality of stationary piers or lateral guide means 47'-48' and 49'-50' on opposite sides of the hydromotive body H and which support the transversely extending dam wall 28'. This dam wall 28' is in turn additionally supported by means of connecting members 42' and piers 40' joined to the underlying downstream supporting slab 26.

The fixed dam wall 28' includes two opposite faces, namely an upper face 32' and a lower face 31' such that when the hydromotive body H is disposed in the manner illustrated in FIG. 6 with the fluid retaining wall 11 parallel to the dam wall 28', the only passage available for fluid from the basin side 24 to the sea side 25 is through the conduit extending through the respective hydromotive assemblies H' yet when the hydromotive body H is rotated from the illustrated position to a 90° displaced position, then an ample sluiceway passage is defined between the dam wall lower face 31' and the depressed or lowered upper wall 17' of the rotatable hydromotive body H. The thus opened passageway 33' through the fixed structural body of the dam will be seen to include an upstream open end 30' and a downstream open end 35' which define the limits of the passageway 33'. Accordingly, it will be appreciated that by the simple rotation of the hydromotive body H between the two alternately described positions, the function of the dam installation is easily transformed from one of alternative energetic modes to another comprising a sluicing mode. When in the position of FIG. 6 or 0° position, the hydromotive body H functions as a hydrodynamic energetic direct positive apparatus which in a tidal powered installation would accompany the ebb cycle whereas when contained in a hydroelectric powered station would accompany a pure hydroelectric generation mode.

Likewise, when the hydromotive body H is displaced by rotating 180° from the position as illustrated in FIG. 6, it is transformed into a mode capable of acting in a hydrodynamic energetic reversed negative manner, which in a tidal powered station would accompany a flood cycle and in a hydroelectric powered station would accompany the pumped-storage accumulation mode. In this last mentioned 180° position, the upper end 12 of the hydromotive fluid retaining wall 11 is nearly coincident with the lower end face 31' of the fixed dam wall 28'. In this case, the sealing means between the two relatively movable walls occurs along a substantially vertical plane while in the first described 0° position and are disposed in an inclined plane at substantially 45° from one another.

In the above described 90° position, no gates are provided for the purpose of achieving the sluicing action and fluid flow is allowed to pass from the upper level basin 24 to the lower sea side level 25 at a significant volumetric rate thus obviating the necessity of costly electro-mechanical equipment to allow initiation of the sluicing mode. This arrangement produces a noticeable improvement over existing hydropowered tidal installations.

The displacement of the hydromotive body H from the 0° position to a 90° position occurs against a hydraulic head differential at the end of a hydropowered cycle, for example, against a 1.5 meter head. To achieve this transformation, one outboard turbine generator 2" is operated in the generation mode so as to realize a positive hydraulic thrust in the hydromotive body H.

Assuming that the hydromotive body is unlocked, the opposite generator 2' may be abruptly disconnected from its associated electrical network and allowed to run in an overspeed regime whereupon a negative hydraulic pulling force is now induced into the hydromotive body. The combination of the two extreme positive and negative thrusts at opposite points of the rotatable body H, together with motorization of the rollers 44' along with equalization of the mass of the rotatable body by controllably actuating the buoyancy compartments 8, all cooperate to produce a positive momentum upon the body H to achieve the rotation thereof about the center axis 59". The combination of the above forces overcomes the hydraulic head and the hydromotive body H is readily displaced to an alternate position so as to transform the functional mode of the dam.

When displaced to the 90° position, the sluicing mode continues until the upper basin water level 24 and lower sea water level 25 are nearly equalized. After the water levels are equalized, rotation may continue between the 90° position and the extreme 180° position to obtain the energetic reversed negative mode in a flood tidal cycle or alternatively, to obtain a pumped-storage reversed accumulation mode in a hydroelectric installation. The plurality of intake open ends 14,14' and 14" of the plurality of hydromotive assemblies H' will at this time be facing the sea side water body 25 while the outlet open ends 15, 51' and 15" of the diffusers will be facing the basin side water body 24. When a suitable hydraulic head develops between the upper sea level 25 and lower basin level 24, then a flood energetic power cycle may begin. This cycle ceases when the head is nearly reduced to 1.5 meters whereupon the rotatable hydromotive body H is once again displaced to a 90° position by the previously described operation of the generators 2' and 2", rollers 44' and buoyancy compartments 8.

When in this 90° position, the function of the installation is transformed to the sluiceway mode to complete the filling of the basin side water level 24 until this level again equalizes the sea side water level 25 whereafter the hydromotive body H is rotated from the 90° position to the starting 0° position and a new direct powered energetic ebb tidal cycle is ready to begin.

Alternatively, the movable hydromotive body wall 11 and the fixed dam wall 28' may be combined into a single movable component associated with the hydromotive body H. Such alternative construction will, however not be free from wave impact, ice-jamming, freezing and corrosion of the movable parts and accordingly, the arrangement shown in FIGS. 6 and 7 will usually be considered more suitable.

The hydromotive body H may be removed in its entirety from its surrounding cooperating structure by inducing a lifting force thereto when in the 0° position. This is achieved by actuating the buoyancy compartments 8 in order to lift the body H in a controlled manner from its basin pit 46' until its bottom wall 18 is coplanar with the top slab surfaces 19 following which a horizontally directed force may be applied by motorizing the turbines 1, 1' and 1" of the generator sets or, by other suitable means. Thereafter, the hydromotive body H is removed from the dam body.

When the hydromotive body H is removed as of above, the gap in the dam structure may be filled by a floatable-sinkable stoplog gated structure positioned within the basin 46' or alternatively, another, different hydromotive body H may be positioned within the same basin 46' as a replacement.

From the foregoing, it will be seen that an improved functionally transformable dam for either tidal or improved hydroelectric installations is provided, having a plurality of selectively transformable hydrodynamic modes. These variable modes are realized in combination with controllably displaceable structures movably positioned upstream and downstream of the main body of the dam. Alternatively, this transformation is realized by means of a rotatable hydromotive body serving also as fluid retaining means combined with fixed guide means. The above transformable modes are alternately achieved in a direct energetic mode, a sluicing mode and a reversed energetic mode.

I claim:

1. A functionally transformable dam including, a main dam body having a fluid flow passage therethrough, conduit means adjacent said fluid flow passage, said conduit means having opposite open ends adapted to admit and discharge fluid therethrough respectively, first guide means fixedly disposed adjacent said passage downstream said main body, said conduit means joined to said guide means for rectilinear displacement therealong between a first position with a selected one of said open ends juxtaposed said passage to a second position with said conduit means removed from juxtaposed said passage, and additional guide means fixedly disposed adjacent said passage upstream said main body, a hydromotive assembly joined to said additional guide means for rectilinear displacement therealong between a first position with said assembly juxtaposed said passage to a second position with said assembly removed from said passage whereby, said hydromotive assembly passage and conduit means, may be selectively displaced to and from juxtaposition said passage to transform the function of said dam from a first energetic mode with fluid passing through said hydromotive assembly, passage and conduit means, to a second mode with said hydromotive assembly and conduit means non-communicating with said passage to define a sluicing mode.

2. A functionally transformable dam according to claim 1 wherein, said first guide means comprises vertically disposed members allowing vertical displacement of said conduit means between said first and second positions.

3. A functionally transformable dam according to claim 1 wherein, said first guide means comprises horizontally disposed members allowing horizontal displacement of said conduit means between said first and second positions.

4. A functionally transformable dam according to claim 2 wherein, said first guide means members include a plurality of piers.

5. A functionally transformable dam including, spaced apart stationary means disposed between upstream and downstream water bodies, a hydromotive body between said stationary means, said hydromotive body including at least one fluid flow conduit having opposite open ends and provided with a turbine-generator set defining a hydromotive assembly, said hydromotive body including a fluid flow passageway, said hydromotive body displaceable between an energetic mode with said conduit conveying water between said two water bodies to a sluicing mode with said fluid flow passageway conveying water between said two water bodies.

6. A functionally transformable dam according to claim 5 wherein, said conduit and passageway are perpendicular to each other.

7. A functionally transformable dam according to claim 5 wherein, said fluid flow passageway is transverse the flow of water between said two water bodies when said hydromotive body is in said energetic mode.

8. A functionally transformable dam according to claim 5 including, a dam wall spanning said spaced apart stationary means above said hydromotive body, a fluid retaining wall atop said hydromotive body and said two walls engageable when said hydromotive body is in said energetic mode.

9. A functionally transformable dam according to claim 5 including, a support slab between said stationary means having a pit basin and said hydromotive body comprising a cylindrical body rotatably displaceable within said pit basin.

10. A functionally transformable dam according to claim 5 wherein, said hydromotive body is rotatably displaced 90° between said energetic and sluicing modes.

11. A functionally transformable dam according to claim 5 including, a support slab between said stationary means beneath said hydromotive body, roller elements supporting said hydromotive body upon said slab for rotation thereof between said modes.

12. A functionally transformable dam according to claim 9 including, roller elements supporting said hydromotive body upon said slab whereby, motorizing of said roller elements produces said rotary displacement.

13. A functionally transformable dam according to claim 10 including, a plurality of said hydromotive assemblies laterally adjacent to one another in said hydromotive body whereby, said rotary displacement is produced by actuating one said turbine-generator set in a generation mode against a reduced hydraulic head as another said turbine-generator set is passed into an overrunning overspeed condition.

14. A functionally transformable dam according to claim 10 including, hermetic chambers in said hydromotive body adapted to receive gas for buoyancy purposes and fluid for sinking purposes.

* * * * *